(12) United States Patent
Chen

(10) Patent No.: US 6,433,838 B1
(45) Date of Patent: Aug. 13, 2002

(54) VIDEO SIGNAL PROCESSING METHOD FOR IMPROVING THE PICTURE OF DIM AREA

(75) Inventor: An-Tung Chen, Ping-Chen (TW)

(73) Assignee: Winbond Electronics Corporation (TW)

( * ) Notice: Subject to any disclaimer, the term of this patent is extended or adjusted under 35 U.S.C. 154(b) by 0 days.

(21) Appl. No.: 09/494,909

(22) Filed: Jan. 31, 2000

(30) Foreign Application Priority Data

Apr. 9, 1999 (TW) ........................................ 88105667 A

(51) Int. Cl.[7] .......................... H04N 5/202; H04N 9/69
(52) U.S. Cl. ........................ 348/674; 348/675; 348/712
(58) Field of Search ................................. 348/674, 675, 348/686, 630, 631, 708, 712, 713, 642, 254, 255, 256; H04N 5/202, 5/21, 9/69, 9/77, 9/64

(56) References Cited

U.S. PATENT DOCUMENTS

| | | | | |
|---|---|---|---|---|
| 5,202,763 A | * | 4/1993 | Sendelweck | 348/674 |
| 5,523,785 A | * | 6/1996 | Muramoto | 348/254 |
| 5,565,931 A | * | 10/1996 | Girod | 348/675 |

* cited by examiner

Primary Examiner—Sherrie Hsia
(74) Attorney, Agent, or Firm—Fish & Richardson P.C.

(57) ABSTRACT

A method of video signal processing that reduces computational and circuit costs. The method of processing a video signal of the present invention comprises the following steps: First, receiving a video input signal including an input luminance signal and input chrominance signals from a signal source. Next, correcting the input luminance signal of the video input signal to generate a corrected luminance signal. And finally outputting the corrected luminance signal and the input chrominance signals as the enhanced video signal to the subsequent video processor, such as a TV encoder, for converting the corrected signal from digital into analog. The correction of the luminance signal is accomplished by first normalizing the luminance signal by a predetermined value of a full-scale luminance. If the normalized luminance signal is greater than a first predetermined percentage, the corrected luminance signal is equal to the input luminance signal. If the normalized luminance signal is less than the first predetermined percentage and greater than a second predetermined percentage, the input luminance signal is corrected by non-linear correction to generate the corrected signal. If the normalized luminance signal is less than the second predetermined percentage, the input luminance signal is corrected by linear correction to generate the corrected luminance signal.

8 Claims, 6 Drawing Sheets

VIDEO SIGNAL PROCESSING METHOD FOR IMPROVING THE PICTURE OF DIM AREA

BACKGROUND OF THE INVENTION

1. Field of the Invention

The present invention relates to video signal processing, and more particularly to a method of enhancing the picture detail of dim portions of a video while at the same time decreasing the amount of computation required for video signal processing, thereby reducing the manufacturing cost of the signal encoding chip.

2. Description of the Prior Art

To be viewed in an analog video display device, such as a TV set, a digital video signal needs to be converted by a TV encoder into an analog TV signal. Because the content of a video frame is too dark, or the light in an environment of watching TV is too bright, portions of the image often appear dim and the detail is not easily discerned. Such dim portions may be caused by unsatisfactory brightness contrast of the display device.

For display devices, including CRTs, it is known that the intensity of light does not have a linear relationship with the applied input voltage. The non-linearity is referred to as the gamma value, which when expressed as the power of a normalized voltage equals the normalized intensity. Gamma values vary for CRTs; however, it is usually close to 2.5 because the non-linear increment of an output voltage is caused by electrostatic effects in the electronic gun. Refer to FIG. 1, which is a diagram of the relationship between the normalized intensity and the input voltage. As shown in the figure, the gamma effect generated by a CRT may reduce the brightness of an image in both dark areas and bright areas. For example, it can be observed in the diagram that, due to the exponential relationship with the input voltage, a brightness of only 18% will be displayed when the input voltage is 50%. This causes a reduction of the brightness in the dark areas of the image, thereby reducing the quality of the viewed image in this region.

Gamma correction is the nonlinear expansion and compression of video signals used to compensate for the non-linearities in display devices (please see as "Video Demystified by Keith Jack - High Text Publications 1995") Gamma correction can also be used to enhance the picture detail of dim portion. Gamma correction can be accomplished by various means; for example, built-in analog devices are often used in a TV set, while computer systems can use application software to correct the digital signal before its convertion to analog signal for display on the screen.

FIG. 2 is a flowchart illustrating a digital video signal that is converted by a TV encoder into an analog signal for display on the TV screen. As shown in diagram, a digital video source 5, such as in a PC, reads the image data from a CD_ROM, comprising the original digital signal SIG5, and outputs the signal which is decompressed by a video signal processing circuit 10, such as MPEG. Generally, such output signals include a processed digital luminance signal SIG10 and other processed digital chrominance signals SIG20. Some devices, such as a digital camera, combine the digital video source 5 and the video signal processing circuit 10, thereby outputting the digital luminance signal SIG10 and the digital chrominance signals SIG20. The luminance signal SIG10 and the chrominance signals SIG20 in turn are input into TV encoder 20 for conversion into an analog signal SIG30.

Due to the quality of the video itself (contrast is especially a problem when the signal has been converted from film to video), or the exceeding brightness of the surround during viewing, picture detail of the dim areas is reduced. In systems using the RGB color model (wherein discrete voltages are applied to red, green, and blue electron gun control circuitry of a display device), a method called RGB gamma correction is used to solve this problem before conversion by the TV encoder.

FIG. 3 is a flowchart illustrating RGB Gamma Correction. First, as shown in FIG. 2, the digital video signals are output through the digital video source 5 and the video signal processing circuit 10. In this case, the digital video signals comprise the digital luminance signal SIG10 and the digital chrominance signals SIG20, wherein the signal SIG20 includes two color difference signals (S30). The luminance signal SIG10 and the chrominance signals SIG20, are then converted by a matrix operation into three RGB signal components (S32). Next, a gamma correction processing is performed (S34). The operation of gamma correction with an exponential value is then applied to the each of the three RGB signal components. For example, if the inputs of the three components are expressed by Rin, Gin, and Bin, and the three signal after gamma correction are expressed by Rout, Gout, and Bout, then the gamma correction relationship can be expressed by:

$Rout=(Rin)^{1/r}$;

$Gout=(Gin)^{1/r}$; and $Bout=(Bin)^{1/r}$;

wherein, the value r is varied according to the desired amplitude of the correction, usually being greater than 1 to enlarge the contrast of a low intensity signal and to compress the variation of a high intensity signal against the saturation. Finally, the corrected RGB signals are converted by a matrix operation into a brightness/chrominance signal acceptable for a TV encoder (S36), which converts the signal into the analog TV signal for outputs by a display device, such as a TV set (S38).

Note that if the RGB gamma correction is conducted for each pixel of the three components of the three signal components by computation, the correction will consume a large amount of time and system resources. Therefore, the prior art normally accomplishes the exponential operation described above by the use of a lookup table. However, the prior art described above is still disadvantageous for the following reasons. First, because it is necessary to respectively process the gamma correction for each pixel of the three signal components, the needed computation is relatively large. Second, the video signal has to be converted twice, i.e., the conversion from luminance/chrominance to RGB before gamma correction as well as the conversion from RGB to luminance/chrominance after gamma correction. Hardware is needed to complete these conversions, which increases the manufacturing cost.

SUMMARY OF THE INVENTION

Therefore, it is an object of the present invention to provide a method of processing a video signal which can improve the picture detail of dim areas of an image without a large amount of computation so as to decrease video processing time and reduce the manufacturing cost of the video processing device.

The method of processing a video signal of the present invention comprises the following steps: First, receiving a video input signal including an input luminance signal and input chrominance signals from a signal source. Next, correcting the input luminance signal of the video input signal to generate a corrected luminance signal. And finally outputting the corrected luminance signal and the input chrominance signals as the processed video signal to a TV encoder, for converting the corrected signal from digital into an analog TV signal.

The correction of the luminance signal is accomplished by first normalizing the luminance signal by a predetermined value of a full-scale luminance. If the normalized luminance signal is greater than a first predetermined percentage, the corrected luminance signal is equal to the input luminance signal. If the normalized luminance signal is less than the first predetermined percentage and greater than a second predetermined percentage, the input luminance signal is corrected by non-linear correction to generate the corrected signal. If the normalized luminance signal is less than the second predetermined percentage, the input luminance signal is corrected by linear correction to generate the corrected luminance signal.

In the video processing method disclosed in accordance with this invention, because increasing luminance contrast often improve brightness contrast, the dark areas can be discerned more easily after this method applied. Besides, the portion of the luminance signal corrected by a non-linear relationship is shortened, decreasing the computational cost. Further, by dividing the luminance signal into three Ranges and applying appropriate correction to each Range, the wash-out effect is avoided without the need of RGB correction, which further saves computational cost and allows a simplified circuit design.

BRIEF DESCRIPTION OF THE DRAWINGS

Other objects, features, and advantages of the present invention will become apparent from the following detailed description of the preferred but non-limiting embodiment. The description is made with reference to the accompanying drawings in which.

DETAILED DESCRIPTION OF THE PREFERRED EMBODIMENT

Figure 1:
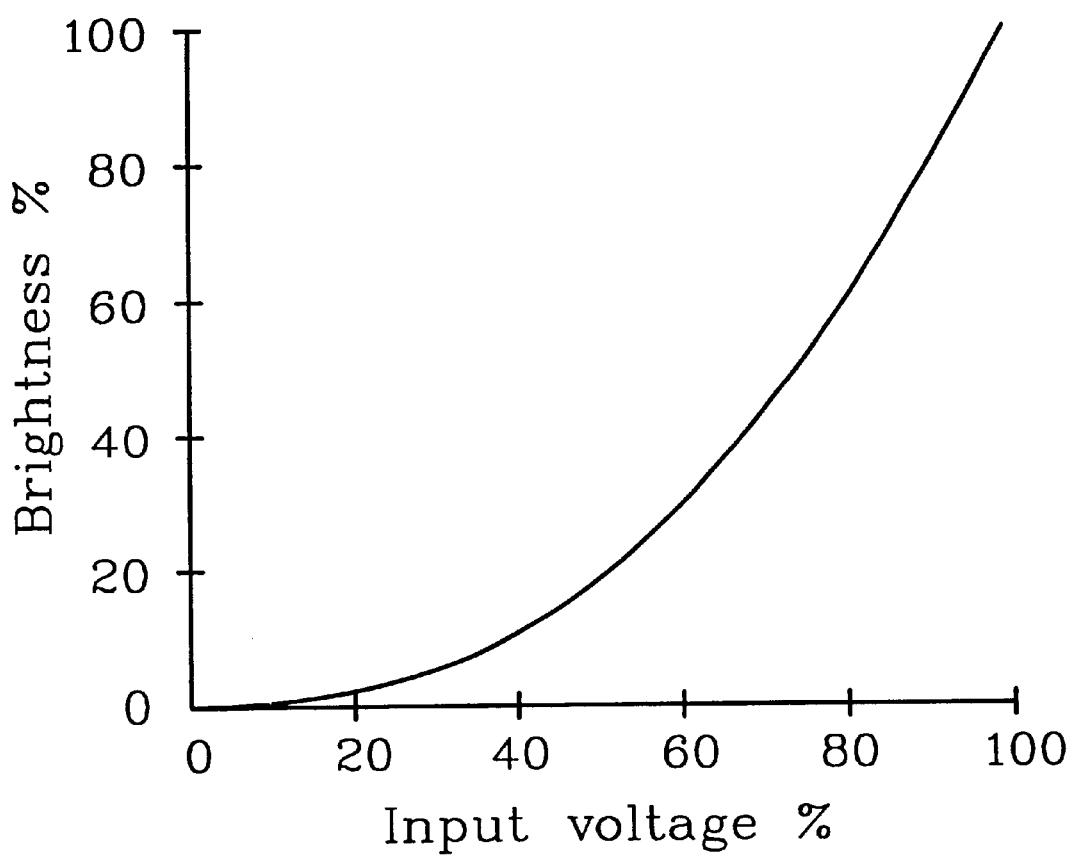
FIG. 1 is a diagram illustrating the relationship between the normalized brightness and the input voltage of a typical CRT.
Figure 2:
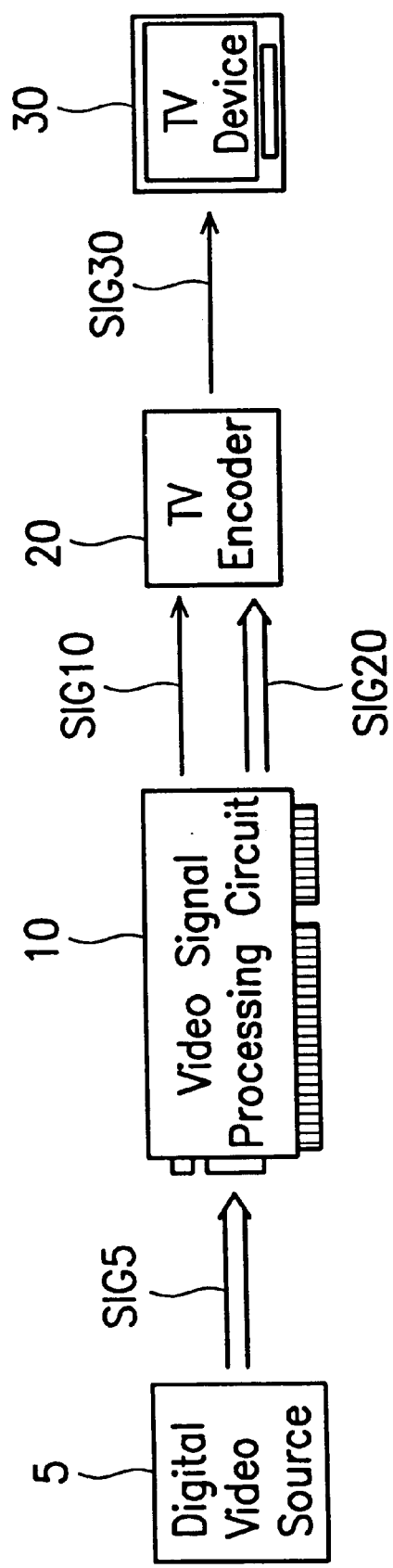
FIG. 2 is a flowchart illustrating a digital video signal that is converted into an analog TV signal for display on the TV screen.
Figure 3:
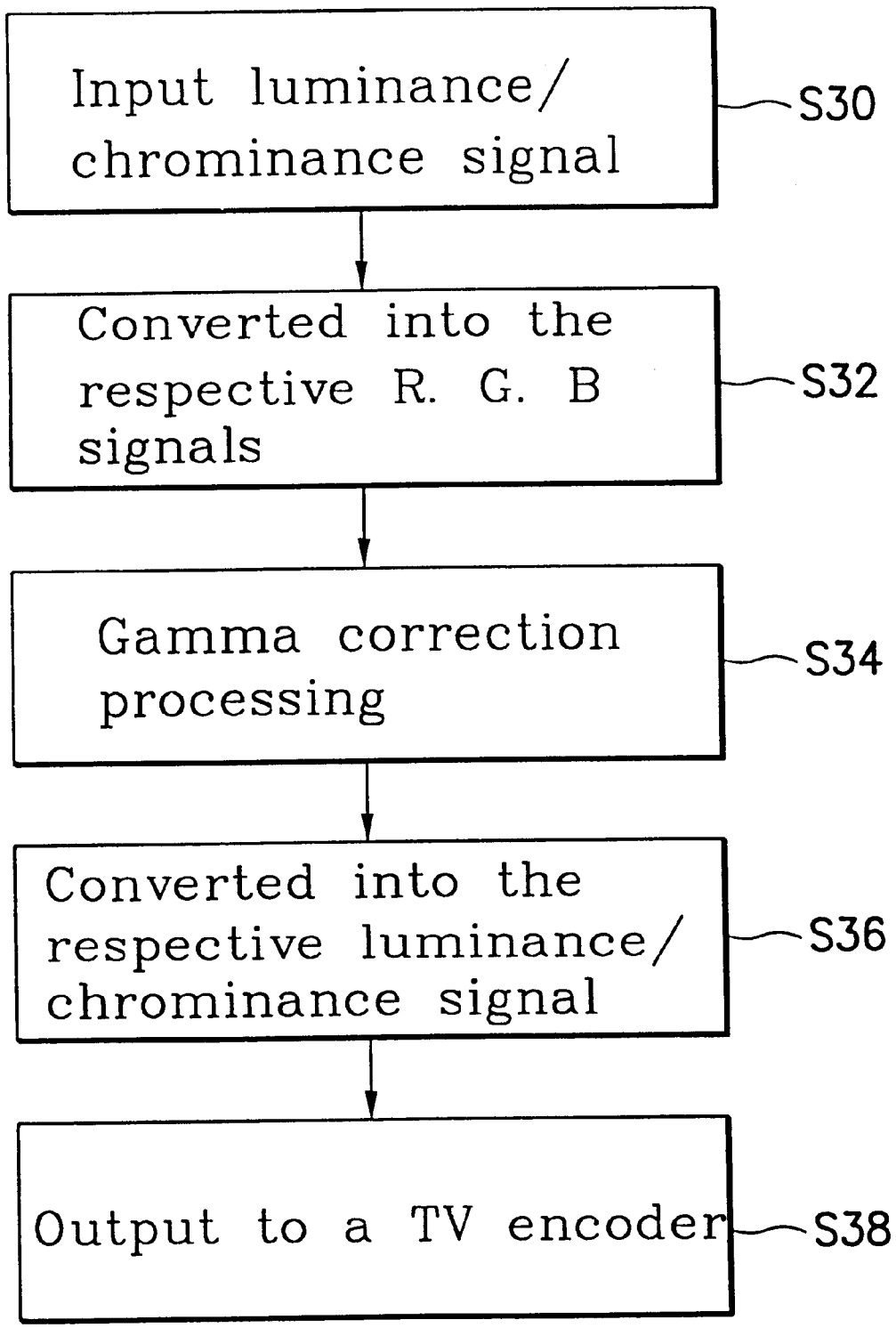
FIG. 3 is a flowchart illustrating RGB gamma correction according to the prior art.
Figure 4A:
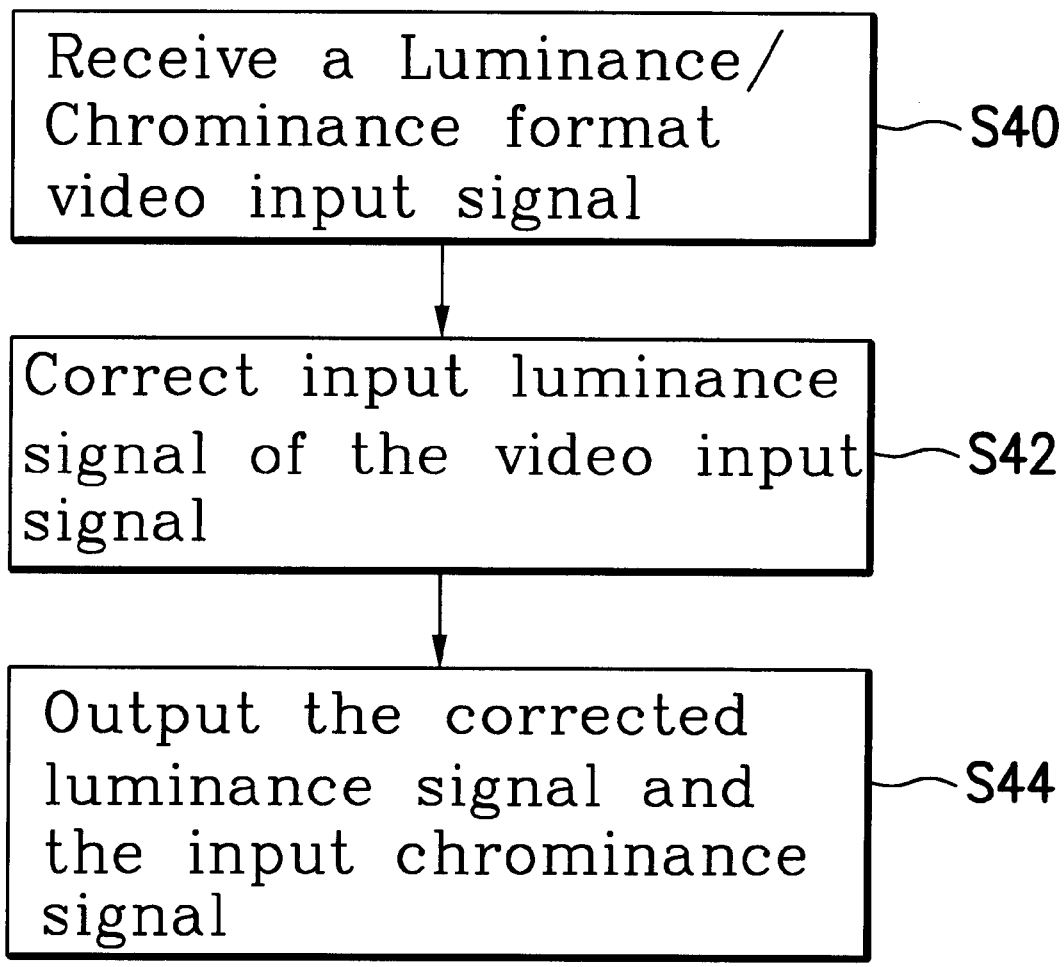
FIGS. 4A and 4B are flowcharts illustrating luminance signal three level non-linear correction according to the present invention.
Figure 4B:
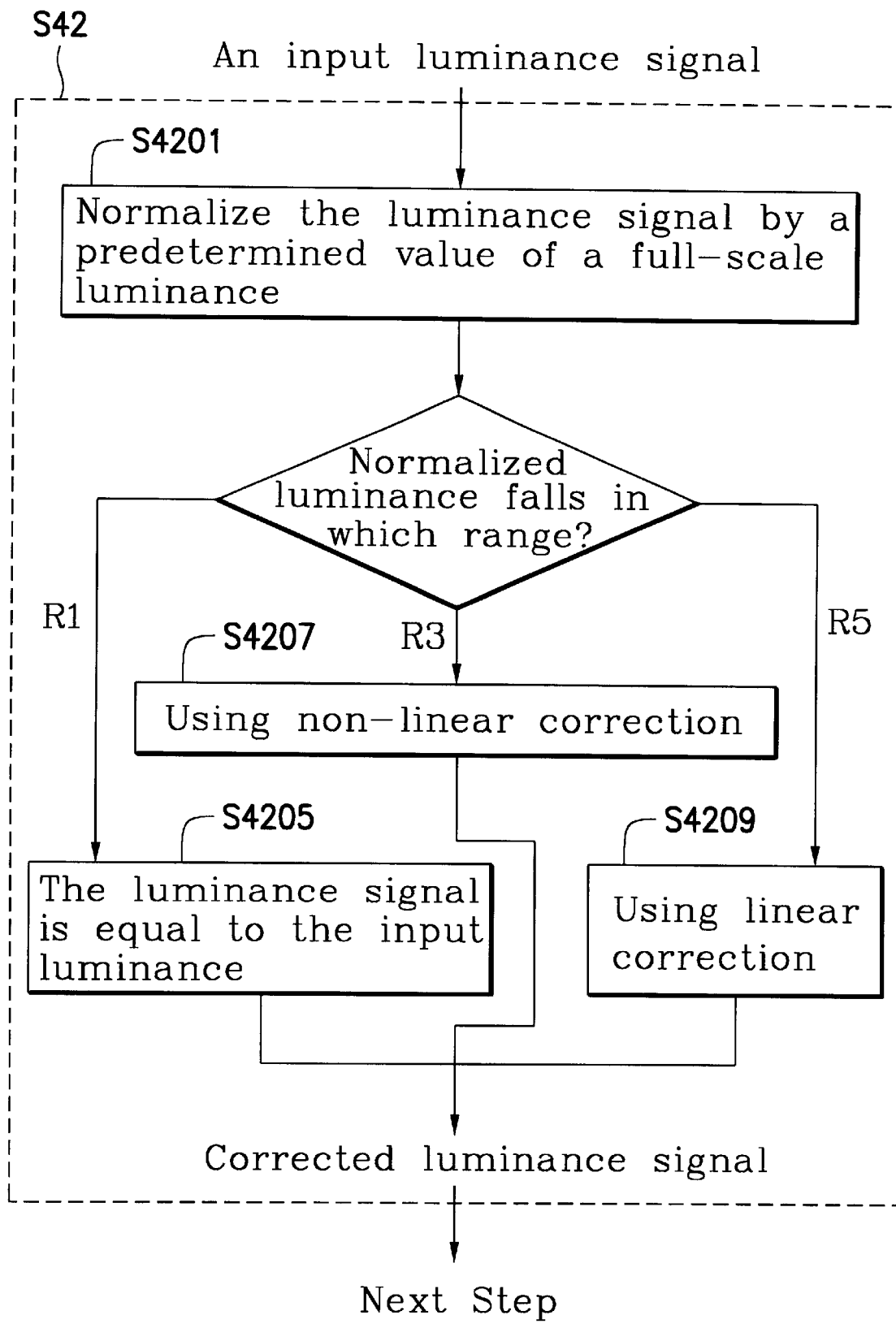

FIG. 4A and 4B are flowcharts illustrating non-linear correction according to the present invention, wherein FIG. 4B is a more detailed description of the second step of FIG. 4A. Referring to FIG. 4A, the method of processing a video signal of the present invention comprises the following steps: First, receiving a video input signal including an input luminance signal and input chrominance signals from a signal source (S40). Next, correcting the input luminance signal of the video input signal to generate a corrected luminance signal(S42). And finally outputting the corrected luminance signal and the input chrominance signals to a TV encoder for converting the corrected signal from digital into analog (S44).

Referring to FIG. 4B, the correction of the luminance signal is accomplished by first normalizing the luminance signal by a predetermined value of a full-scale luminance (S4201). Then, if the normalized luminance signal is greater than the first predetermined percentage (R1), the corrected luminance signal is equal to the input luminance signal (S4205). If the normalized luminance signal is less than the first predetermined percentage and greater than a second predetermined percentage (R3), the input luminance signal is corrected by non-linear correction to generate the corrected signal (S4207). If the normalized luminance signal is less than the second predetermined percentage (R5), the input luminance signal is corrected by linear correction to generate the corrected luminance signal (S4209).

Figure 5:
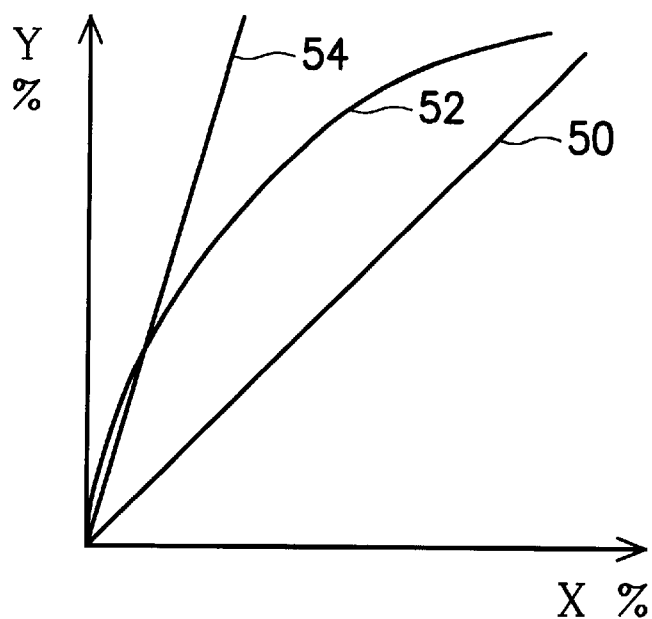
FIG. 5 is a diagram illustrating the relationship between the original luminance and the corrected luminance signal of some types of correcting function.

FIG. 5 illustrates the relationship between the original and corrected luminance signal of some types of correcting function. X represents the normalized original luminance signal, Y represents the normalized luminance output after correction.

When no correction is performed, the relationship between X and Y should be:

Y=X i.e., the relationship is expressed by line 50 in the diagram.

If linear correction is performed to increase the luminance signal, the relationship between X and Y becomes:

$$Y = t3 \times X, \ t3 > 1$$

i.e., the relationship expressed by line 54 in the diagram, wherein the luminance of the input video signal is enlarged by a constant rate.

On the other hand, if non-linear correction is performed to increase the luminance signal, the relationship between X and Y becomes:

$$Y = X^{t4}, \ t4 < 1$$

i.e., the exponential relationship as shown in line 52, whereby the luminance of original video signal is non-linearly enlarged.

Note that for both line 52 and line 54 in FIG. 5, the luminance of the entire range is raised. In other words, in the video frame, the luminance of video signal will be raised in both the bright areas and in the dark areas. Although this will improve the picture detail of a video in the dark areas, the colors will become faded because the color components have not been raised in proportion as the luminance increased; besides, the entire frame will be prone to overbright.

Therefore, in the present invention, the luminance signal is divided into three ranges, wherein different methods of correction are applied to the luminance signal depend on which range it falls into.

Figure 6:
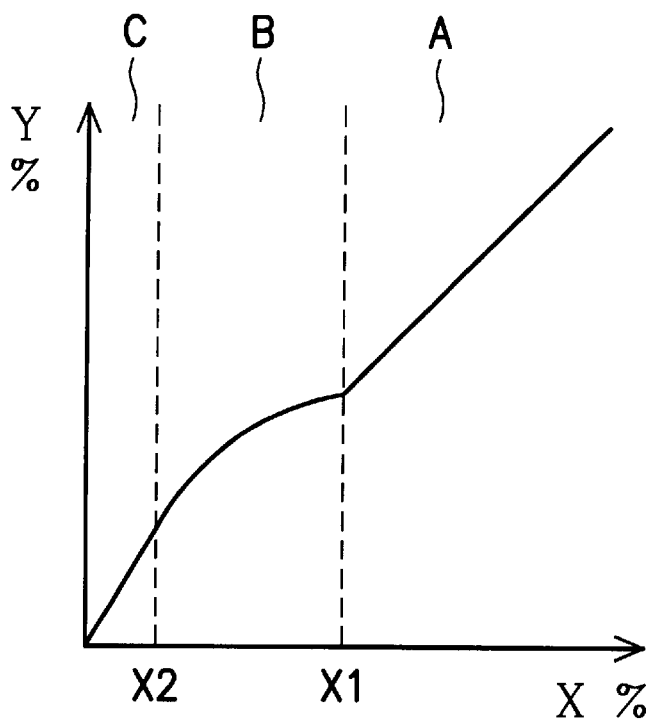
FIG. 6 is a diagram illustrating the relationship between the original and corrected luminance signal in the method of the present invention.

Referring to FIG. 6, according to an embodiment of the invention, when the normalized luminance signal is greater than 50% (X1, Range A), the luminance signal of the original video signal is maintained, e.g., no correction is performed. Accordingly, the relationship between X and Y is still:

Y=X

It is understood that the value of X1 can be reasonably adjusted to suit the demands of the video signal source or a video display device.

When the value of luminance signal is between X1 and X2(Range B), wherein X2 is 13.5% in this embodiment, non-linear correction is applied. It is understood that the value of X2 can be reasonably adjusted to suit the demands of the video signal source or a video display device. Further, it is understood that many kinds of non-linear correction can be applied to the brightness in Range B (e.g., an exponential relationship, a projectile line relationship, or a step relationship) for the purpose of improving the picture detail of a video frame in the dark areas. An exponential relationship is applied to luminance signal falling into Range B, in this embodiment, wherein the relationship between X and Y is:

$$Y=(2X)^{t1}/2, t1<1$$

In this embodiment, value t1 is 0.6. It is understood that the value of t1 can be reasonably adjusted to suit the demands of the video signal source or a video display device, wherein, in Range B, the smaller luminance signal are raised and the larger signal are compressed. As seen in the diagram, in Range B, the slope of the curve near X2 is greater than the slope of the curve near X1. This method improves the luminance contrast, when its value is small (near X2), but has no influence on the luminance signal when its value is high (Range A). Because increasing luminance contrast often improve brightness contrast, the dark areas can be discerned more easily after this method applied.

When luminance signal falls into Range C, a linear correction is applied to increase its contrast, wherein:

$$Y=t2 \times X, t2>1$$

In this embodiment, value t2 is 1.7. It is understood that the value of t2 can be reasonably adjusted to suit the demands of the video signal source or a video display device.

There are two reasons for utilizing a linear relationship between X and Y in this Range: first, this range of luminance often results in low brightness, the luminance contrast must be increased to enhance the clarity of picture detail; second, if an exponential correction such as that applied in Range B is utilized, the gain close the black will be enlarged too much and the noise in the darker areas of the image will be amplified too much. The linear expansion limits the gain close to black.

In the video processing method disclosed in accordance with this invention, the portion of the luminance signal corrected by a non-linear relationship is shortened, decreasing the computational cost. Further, by dividing the luminance signal into three ranges and applying appropriate correction to each range, the wash-out effect is avoided without the need of RGB correction, which further saves computational cost and allows a simplified circuit design.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention.

Accordingly, the scope of the invention shall be determined only by the appended claims and their equivalents.

What is claimed is:

1. A video signal processing method for improving the picture of a dim area, comprising the following steps:

receiving a video input signal including an input luminance signal and input chrominance signals from a signal source;

normalizing the luminance signal by a predetermined value of a full-scale luminance;

using the input luminance signal as a corrected luminance signal when the normalized luminance signal is greater than a first predetermined percentage;

nonlinearly correcting the luminance signal to generate the corrected luminance signal when the normalized luminance signal is less than the first predetermined percentage and greater than a second predetermined percentage;

linearly correcting the luminance signal to generate the corrected luminance signal when the normalized luminance signal is less than the second predetermined percentage; and outputting the corrected luminance signal and the input chrominance signals as the enhanced video signal to a subsequent video processor.

2. The method as claimed in claim 1, wherein the first predetermined percentage is 50%.

3. The method as claimed in claim 1, wherein the second predetermined percentage is 13.5%.

4. The method as claimed in claim 1, wherein the nonlinear correcting step is implemented by the formula:

$$Y^{out}=(Y^{in})^{t1}$$

Where $Y^{in}$ is the luminance signal, $Y^{out}$ is the corrected luminance signal, t1 is a real number between zero and one.

5. The method as claimed in claim 4, wherein the real number t1 is 0.6.

6. The method as claimed in claim 1, wherein the linear correcting step is implemented by the formula:

$$Y^{out}=t2 * Y^{in}$$

Where $Y^{in}$ is the luminance signal, $Y^{out}$ is the corrected luminance signal, t2 is a real number greater than 1.

7. The method as claimed in claim 6, wherein the real number t2 is 1.7.

8. The method as claimed in claim 1, wherein the subsequent video processor is a TV encoder.

* * * * *